Jan. 1, 1963  A. R. WERFT ETAL  3,071,476
CHEWING DEVICE
Filed May 12, 1960
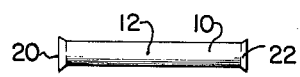
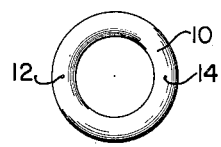
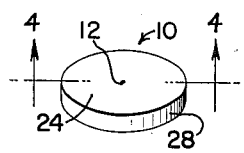
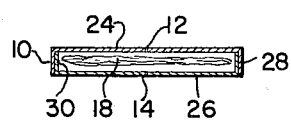
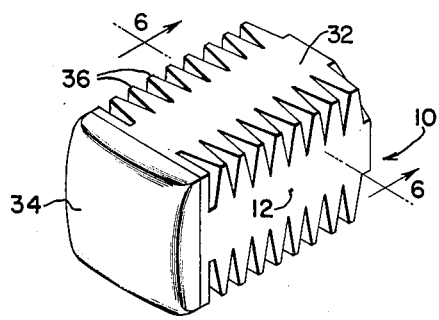
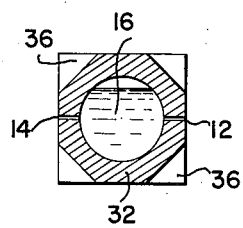
INVENTORS
August R. Werft
Allan J. Werft
BY Adams, Forward & McLean
ATTORNEY

United States Patent Office 3,071,476
Patented Jan. 1, 1963

3,071,476
CHEWING DEVICE
August R. Werft and Allan J. Werft, both of 233 Dixon Blvd., Uniontown, Pa.
Filed May 12, 1960, Ser. No. 28,689
10 Claims. (Cl. 99—135)

This invention is a chewing device which comprises a resilient, impervious, colored or colorless envelope containing a material which is dispersible in fluid which passes into and out of the envelope. The passage consists of one, or two minute holes in the envelope. The device is "bite-size," that is, it fits completely into the mouth of the person using it, and the material which it contains will generally include flavoring.

The invention has for its object the slow release, whenever and as desired, of the substance inside the envelope. When the device is placed in the mouth and chewed or flexed, a small quantity of the substance is dispersed, that is, dissolved or otherwise distributed in the saliva. The slow release of the substance through the pin hole or holes of the container is designed to give a long lasting flavor sensation to the user versus a relatively short period for chewing gum, candy lozenges or other now available substances that dissolve readily in the mouth. The device may contain, and release to the saliva whenever and as desired, a small quantity of flavoring and/or vitamins, odor-killing chemicals, instant coffee and any other substance that is not injurious to the users' health. This invention may be used to replace eating of candy to reduce sugar intake and can also be used as a substitute for chewing gum; it will not stick to dentures.

In a further embodiment of the device it may be provided with stiff projections to give a cleaning and/or massaging effect to the teeth and gums of the user.

The envelope performs several functions in the device: it holds the substance to be dispersed, it provides for slow, controlled release of the substance to the saliva, and also it preserves and protects the inside substance from the atmosphere or other deteriorating hazards during storage. The envelope must have certain properties. It must be flexible, in order to be worked by the teeth when chewing, but must not be susceptible to permanent deformation in ordinary chewing. The envelope must be completely chemically inert to the fluids, e.g., saliva, with which it will come into contact. Also, the envelope will keep its shape at ordinary body temperatures. The resilient, impervious envelope is conveniently made of a moldable or extrudable solid resinous material such as polyethylene or rubber which is tough and not easily punctured by the teeth in chewing. The envelope is sealed completely to a liquid-tight condition except for the passage, which will be described below. Also, the degree of resiliency of the envelope is coordinated with the size of the passage.

The dispersible material inside the envelope may comprise one or many substances which it is desired to disperse in the saliva. When therapeutic substances, such as medicines, are included generally a flavoring is, too. A flavoring is considered to be any palatable tastesentation producing substance. The dispersible material may be in liquid, solid, semi-solid, gel, or other desired state. Where the dispersible substance is a plant or animal extract, the extract itself may be used, or the plant or animal tissue, e.g., mint leaves, may be incorporated into the device. Where a liquid is used it may be desirable to "body" the device by the use of a solid filler. Such a filler will give a firmer chew to the device. Ideally the filler is granular or fibrous and has an absorbent affinity for the dispersible material. A polyethylene envelope with a cotton fibre fill is preferred.

The device may be sold with the one or two minute holes already in it, or the envelope may be pierced just before use by the user with, for example, a pin. The holes provide a passage for dispersing fluid. Each hole is small enough to prevent escape of the contained substance when the device is in its normal, unflexed, state. However, when the device is deformed in chewing, each hole is stretched enough to permit a dispersing fluid, such as saliva to enter and exit the device. It is preferred, that when not flexed the holes are so minute that the passage of all fluids including extraneous fluids such as air or water vapor is prevented and the substance is completely sealed inside the envelope. Where the dispersible material is in fugacious form, one hole will generally suffice to give slow release of the material to the saliva. Where the envelope holds a less fugacious material, such as a solid, a viscous liquid or a liquid absorbed in a filler, two holes may be desired to give the proper release of the material. Although a device having more than two holes is not excluded from this invention, two holes generally will be found adequate and the number of holes will be minimized for proper functioning of the device. The location of the hole or holes in the device is not critical; where two holes are used it may be advisable to locate them opposite to each other in the device.

The invention is susceptible to such modifications as will occur to those skilled in the art and may take any shape which is found convenient, such as miniature simulations of familiar objects, so that the invention is not to be limited by the embodiments shown in the accompanying drawing in which:

FIGURE 1 is a perspective view of the device in capsule form showing flattened, heat-sealed ends;

FIGURE 2 is a perspective view of the device having a toroidal or "dough-nut" shape;

FIGURE 3 is a perspective view of the device in tablet form;

FIGURE 4 is a cross-sectional view along the line 4—4 of FIGURE 3;

FIGURE 5 is a perspective view of the device in lozenge form, showing integral projections suitable for cleaning or massaging the teeth and gums; and FIGURE 6 is a cross-sectional view along the line 6—6 of FIGURE 5.

The device comprises the pliable envelope 10, which is provided with the minute hole or holes 12, 14, which pierce all the way through the thickness of the envelope. As pointed out above, the envelope may contain a body of liquid 16, as shown in FIGURE 6. Also the envelope may contain the liquid absorbed in a fill 18, as shown in FIGURE 4.

The device may be manufactured by merely filling a bite-size plastic tube, as in FIGURE 1, and heat-sealing the ends 20 and 22. A tablet form, such as illustrated in FIGURES 3 and 4, may be produced from a molded top portion 24 and bottom portion 26, which have the raised edges 28 and 30 respectively, which fit tightly, one edge inside the other. Preferably the edges are heat-sealed or adhesively sealed together, but need not be sealed if the fit is so tight that chewing does not separate the top and bottom portions or force saliva into or disperse material out of the device around the edges.

Also, the envelope may be made of a molded cup-shaped member 32, which may be closed with a cap 34 which is heat-sealable to the cup-shaped member 32. This embodiment is shown in FIGURE 5, which also shows the provision of projections 36. These may be molded integrally with the device, although it is also possible to machine them. Preferably, the projections have the saw-tooth configuration shown which can give the projection points, as sharp or as blunt as may be found desirable.

It is thus seen that the device of the invention is suitable for use whenever it is desired to chew for a long period of time without "running out" of flavor.

We claim:

1. A bite-size chewing device comprising a substance within an envelope, said substance being non-toxic, including flavoring material and being dispersible in saliva, said envelope being resilient, resinous, inert, non-toxic and impervious to saliva and not being permanently deformable by ordinary chewing, said substance being sealed within said envelope, except for a passage in the envelope too small to allow escape of the substance when the device is not in use, but stretchable to allow passage of saliva when in use.

2. The device of claim 1 in which the substance is a liquid.

3. The device of claim 2 in which the substance is absorbed in a solid.

4. The device of claim 1 in which the substance is a solid.

5. The device of claim 1 in which the substance is fugacious and the passage comprises one minute hole.

6. The device of claim 1 in which the passage comprises two minute holes.

7. The device of claim 3 in which the solid is cotton fibre.

8. The device of claim 1 in which the envelope is polyethylene.

9. The device of claim 1 in which the envelope is rubber.

10. The device of claim 1 wherein the envelope is provided externally with saw-tooth projections.

References Cited in the file of this patent

UNITED STATES PATENTS

| | | |
|---|---|---|
| 325,711 | Stuckes | Sept. 8, 1885 |
| 810,210 | Laws | Jan. 16, 1906 |
| 904,521 | Ellis | Nov. 24, 1908 |
| 943,945 | Liebich | Dec. 21, 1909 |
| 1,786,606 | Gordon | Dec. 30, 1930 |
| 2,004,957 | Messner | June 18, 1935 |
| 2,987,445 | Levesque | June 6, 1961 |